(12) United States Patent
Deleo

(10) Patent No.: US 11,083,327 B2
(45) Date of Patent: Aug. 10, 2021

(54) METHOD AND MACHINE FOR PREPARING INFANT MILK FORMULA

(71) Applicant: AIRFLO DISTRIBUTORS PTY LTD, Broadmeadows (AU)

(72) Inventor: Joseph Deleo, Broadmeadows (AU)

(73) Assignee: AIRFLO DISTRIBUTORS PTY LTD, Victoria (AU)

( * ) Notice: Subject to any disclaimer, the term of this patent is extended or adjusted under 35 U.S.C. 154(b) by 220 days.

(21) Appl. No.: 16/077,289

(22) PCT Filed: Feb. 10, 2017

(86) PCT No.: PCT/AU2017/050106
§ 371 (c)(1),
(2) Date: Aug. 10, 2018

(87) PCT Pub. No.: WO2017/136887
PCT Pub. Date: Aug. 17, 2017

(65) Prior Publication Data
US 2019/0059635 A1     Feb. 28, 2019

(30) Foreign Application Priority Data
Feb. 11, 2016   (AU) .................. 2016900469

(51) Int. Cl.
*A47J 31/40*      (2006.01)
*A47J 31/52*      (2006.01)
*A47J 31/36*      (2006.01)
*A23L 33/00*      (2016.01)

(52) U.S. Cl.
CPC ............. *A47J 31/407* (2013.01); *A47J 31/40* (2013.01); *A47J 31/52* (2013.01); *A23L 33/40* (2016.08); *A47J 31/3676* (2013.01)

(58) Field of Classification Search
CPC ...... A47J 31/407; A47J 31/40; A47J 31/3676; A47J 31/0642; B65D 85/8043
USPC ........... 99/295, 323; 426/115, 117, 425, 431
See application file for complete search history.

(56) References Cited

U.S. PATENT DOCUMENTS

| 5,570,816 | A | * | 11/1996 | LaBarbera, Jr. | ........ A47J 31/40 141/100 |
|---|---|---|---|---|---|
| 2009/0139978 | A1 | | 6/2009 | Ha | |
| 2009/0151574 | A1 | * | 6/2009 | Nijboer | ..................... F28D 7/14 99/282 |
| 2010/0021604 | A1 | | 1/2010 | Roulin et al. | |
| 2011/0041700 | A1 | * | 2/2011 | Epars | ..................... A47J 31/06 99/295 |

(Continued)

FOREIGN PATENT DOCUMENTS

| CN | 20101554 Y | 2/2008 |
|---|---|---|
| DE | 102009017010 A1 | 10/2010 |

OTHER PUBLICATIONS

International Search Report cited in PCT/AU2017/050106, dated May 11, 2018. (6 pages).

*Primary Examiner* — Reginald Alexander
(74) *Attorney, Agent, or Firm* — Workman Nydegger

(57) ABSTRACT

A machine-implemented method, comprising: heat-sterilising water; cooling the sterilised water; removably receiving a capsule containing powdered infant milk formula in a capsule chamber; injecting the cooled, sterilised water into the capsule chamber and through the capsule to form liquid infant milk formula; steam-sterilising the capsule chamber after removal of the capsule.

18 Claims, 12 Drawing Sheets

(56) References Cited

U.S. PATENT DOCUMENTS

| | | |
|---|---|---|
| 2011/0262601 A1 | 10/2011 | Manser et al. |
| 2012/0088022 A1* | 4/2012 | Carbone ................. A47J 31/40 |
| | | 426/506 |
| 2016/0157670 A1* | 6/2016 | Niron ...................... A47J 31/44 |
| | | 426/416 |
| 2017/0233178 A1* | 8/2017 | Lo Faro ................. A47J 31/44 |
| | | 99/295 |
| 2018/0235398 A1* | 8/2018 | Maziel ..................... A61L 2/04 |
| 2019/0075964 A1* | 3/2019 | Della Pietra .......... A47J 31/461 |

* cited by examiner

METHOD AND MACHINE FOR PREPARING INFANT MILK FORMULA

FIELD

The present invention relates to a method and machine for preparing infant milk formula.

BACKGROUND

Infant milk formula is conventionally prepared manually by boil-sterilising water, adding the boiled water to a baby bottle, allowing the boiled water to cool to a drinking temperature, measuring and adding a dose of powdered infant milk formula to water in the bottle, and shaking the bottle to mix the powder with the water to form liquid infant milk formula. Furthermore, the baby bottle, measuring spoon and other implements involved in each step must be cleaned before reuse.

Conventional preparation of infant milk formula suffers from various drawbacks. The manual steps of water boiling, bottle filling, water cooling, powder dispensing, mixing, and bottle/implement cleaning are time consuming and must be repeated frequently day and night. Furthermore, performing these steps manually undermines food hygiene and safety, and hence increases the risk of microbiological contamination of the infant milk formula which can cause serious illness in infants.

In this context, there is a need for improved solutions for preparing infant milk formula that are safe, hygienic and convenient.

SUMMARY

According to the present invention, there is provided a machine-implemented method, comprising:
heat-sterilising water;
cooling the sterilised water;
removably receiving a capsule containing powdered infant milk formula in a capsule chamber;
injecting the cooled, sterilised water into the capsule chamber and through the capsule to form liquid infant milk formula;
steam-sterilising the capsule chamber after removal of the capsule.

The water may be heated to a sterilisation temperature between around 70° C. and 100° C.

The water may be stored in a water tank and maintained at the sterilisation temperature for a predetermined time, for example, between around 1 minute and 10 minutes.

The sterilised water may be cooled to a drinking temperature between around 35° C. and 45° C., for example, between around 37° C. and 40° C.

The cooled, sterilised water may be stored in the water tank and maintained at the drinking temperature until the water tank is empty.

The method may further comprise generating an alert to steam-sterilise the capsule chamber after removal of the capsule.

The present invention further provides a machine, comprising:
a water heater and a water cooler respectively configured to heat and cool water stored in a water tank;
a pump connected to the water tank;
a capsule chamber fluidly connected to the water tank, and configured to removably receive a capsule containing powdered infant milk formula; and
a controller connected to the water heater, the water cooler and the pump, wherein the controller is configured to implement the method described above.

The water cooler may comprise a finned air-cooled heat sink configured to cool the water tank. The finned air-cooled heat sink may comprise a finned heat sink mounted around the water tank, and a ducted cooling fan configured to direct cooling air over and around the finned heat sink.

The machine may further comprise a user interface connected to the controller and configured to receive user selections of one or more of water temperature, heat-sterilisation time and steam-sterilisation time.

The machine may further comprise an alert generator configured to generate an alert to steam-sterilise the capsule chamber after removal of the capsule.

The machine may further comprise a housing configured to house functional components of the machine.

The housing may comprise a drip tray arranged under the capsule chamber.

The machine may further comprise a steam generator connected to the water tank and the capsule chamber.

The machine may further comprise an appliance tray for supporting and electrically connecting a kitchen appliance, wherein the tray is outwardly foldable from the housing.

The present invention also provides a capsule for containing powdered infant milk formula that is suitable for use in the method or machine described above, wherein the capsule comprises:
a hollow generally cylindrical body portion having a top opening sealingly closed by a pierceable membrane;
a hollow generally hemispherical base portion having a central bottom pierceable closure; and
a plurality of positioning flanges extending downwardly from the base portion around the central bottom opening.

The bottom pierceable closure may comprise one or more weakened frangible portions integrally formed with the base portion.

The plurality of positioning flanges may be complementarily shaped and configured to the capsule chamber of the machine described above.

BRIEF DESCRIPTION OF DRAWINGS

Embodiments of the invention will now be described by way of example only with reference to the accompanying drawings, in which.

DESCRIPTION OF EMBODIMENTS

Figure 1:
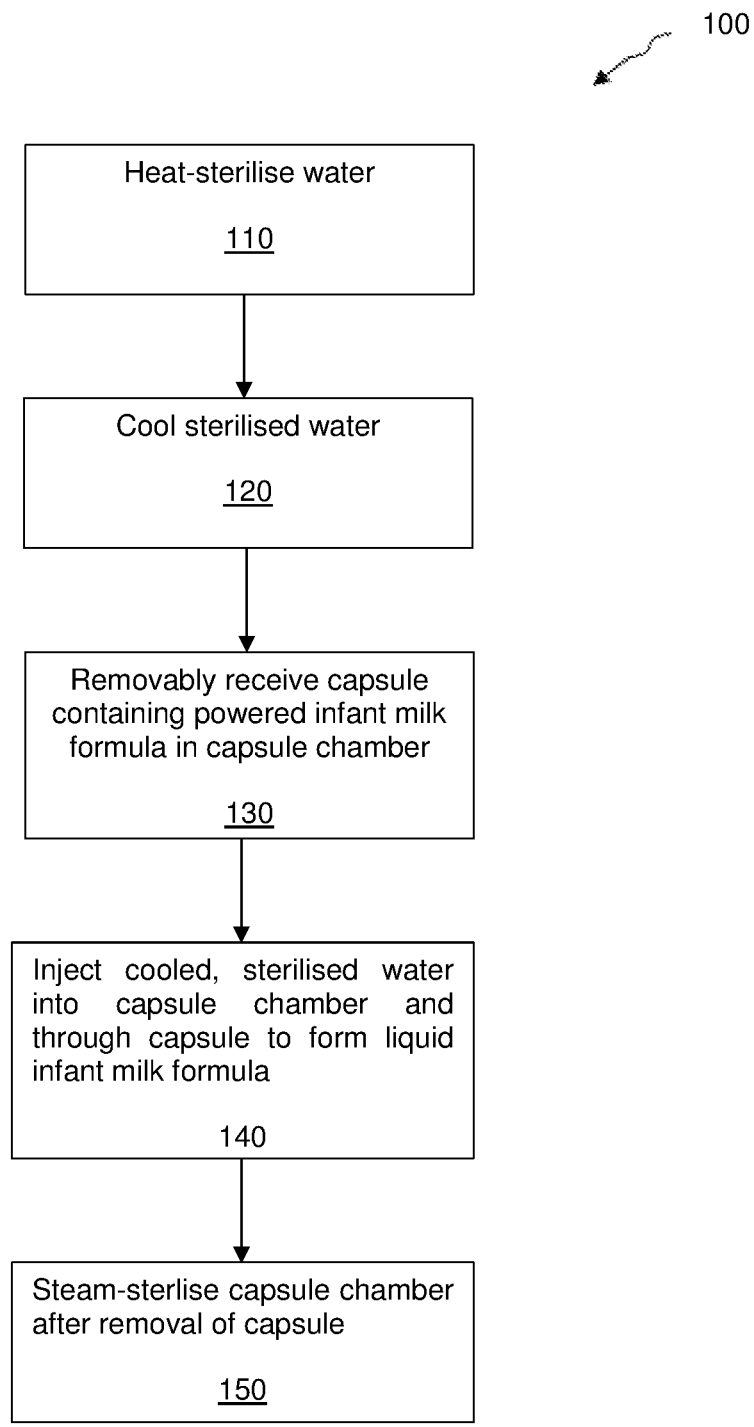
FIG. 1 is a flow chart of a machine-implemented method of preparing infant milk formula according to an embodiment of the present invention.
Figure 2:
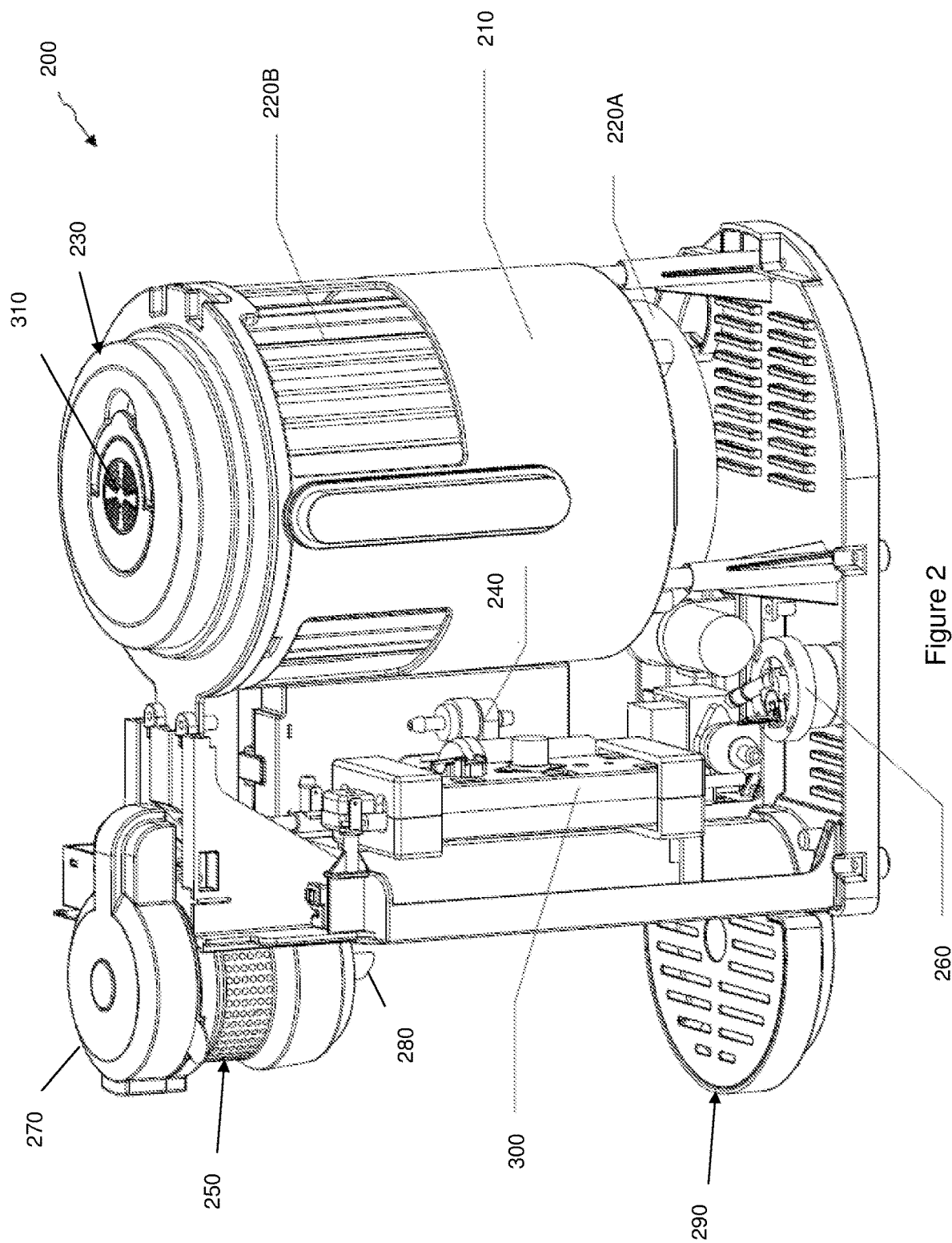
FIG. 2 is a partial side perspective view of an embodiment of a machine for implementing the method.
Figure 3:
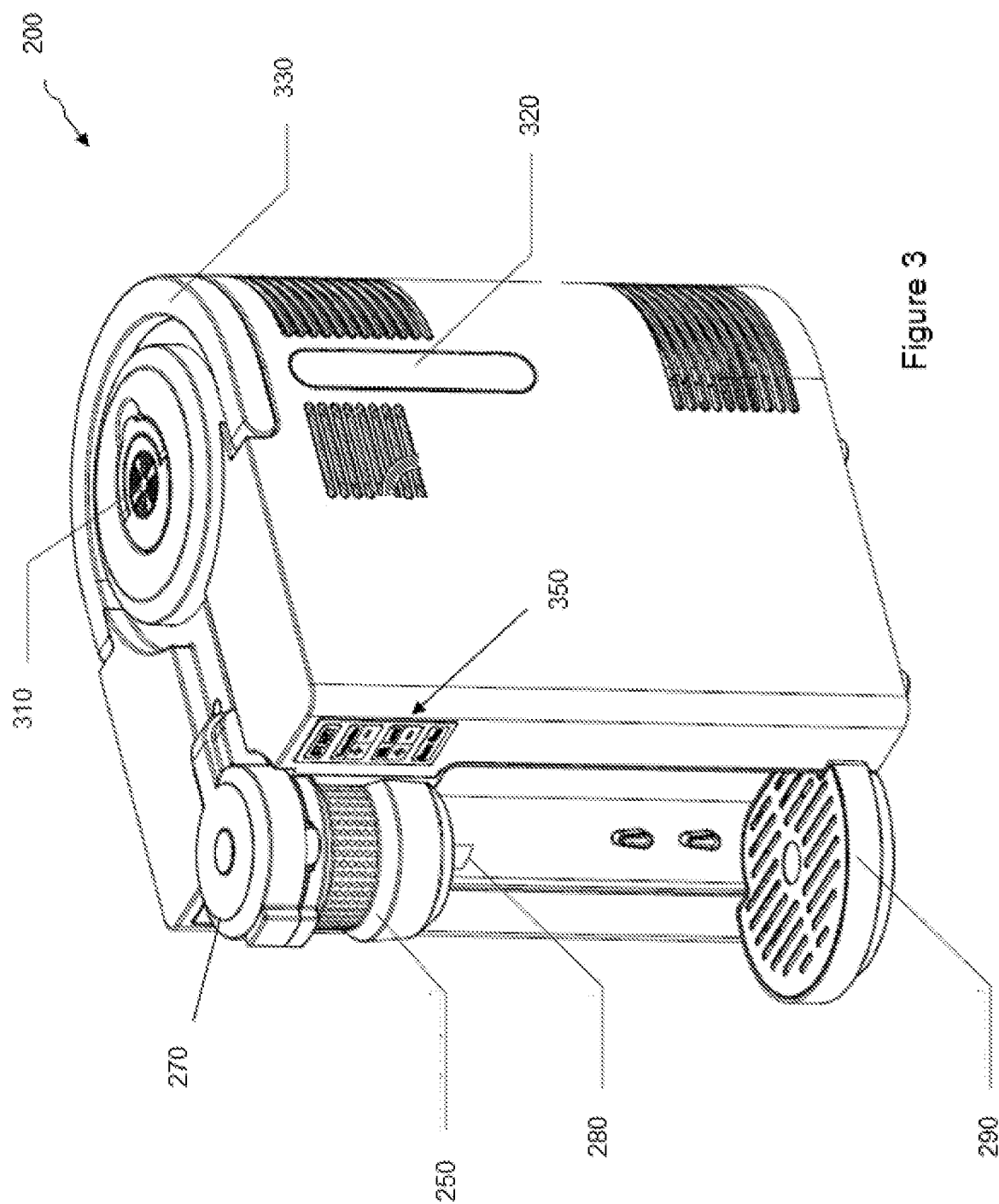
FIGS. 3 and 4 are front side and rear side perspective views of the machine.
Figure 4:
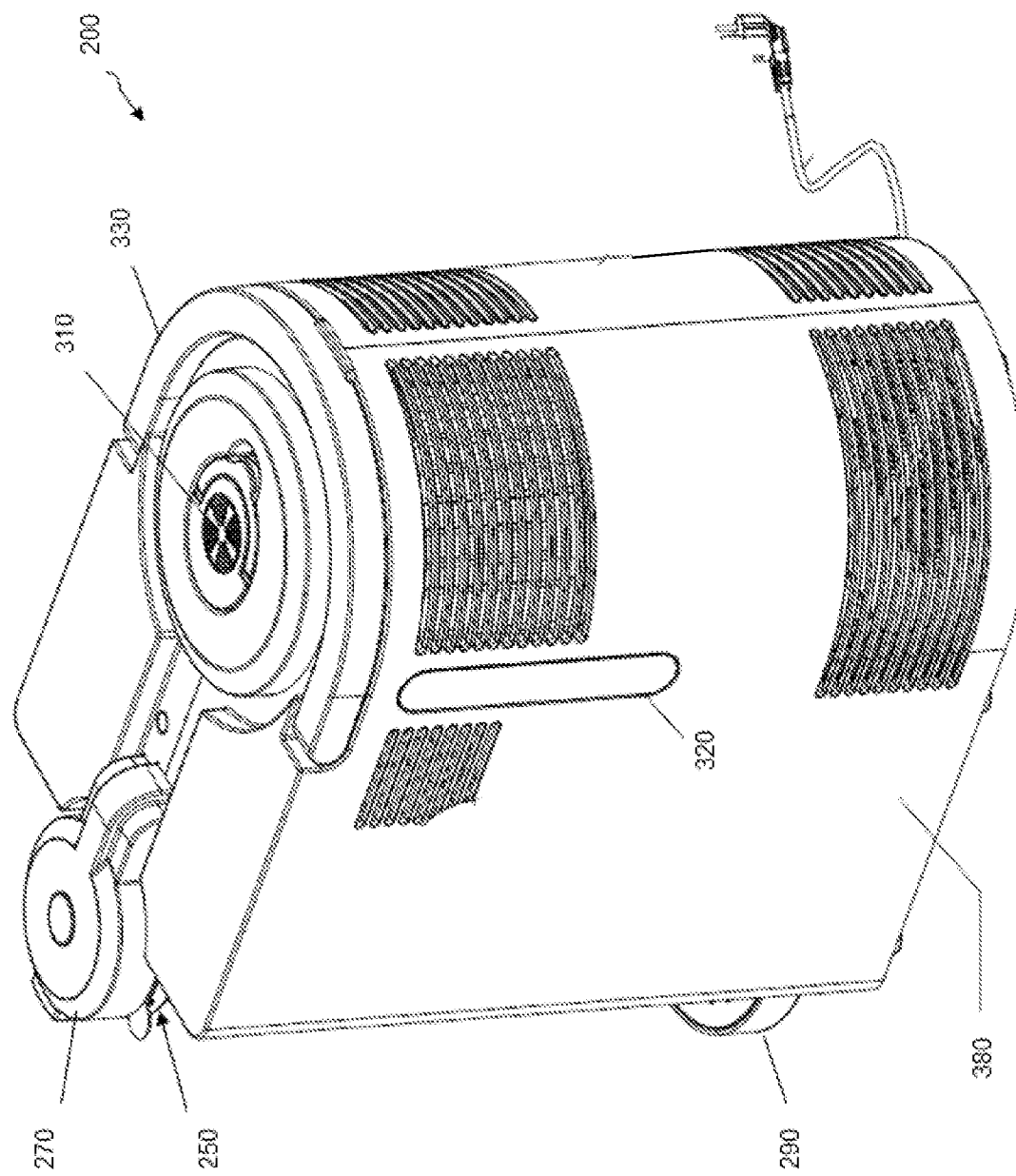
Figure 5:
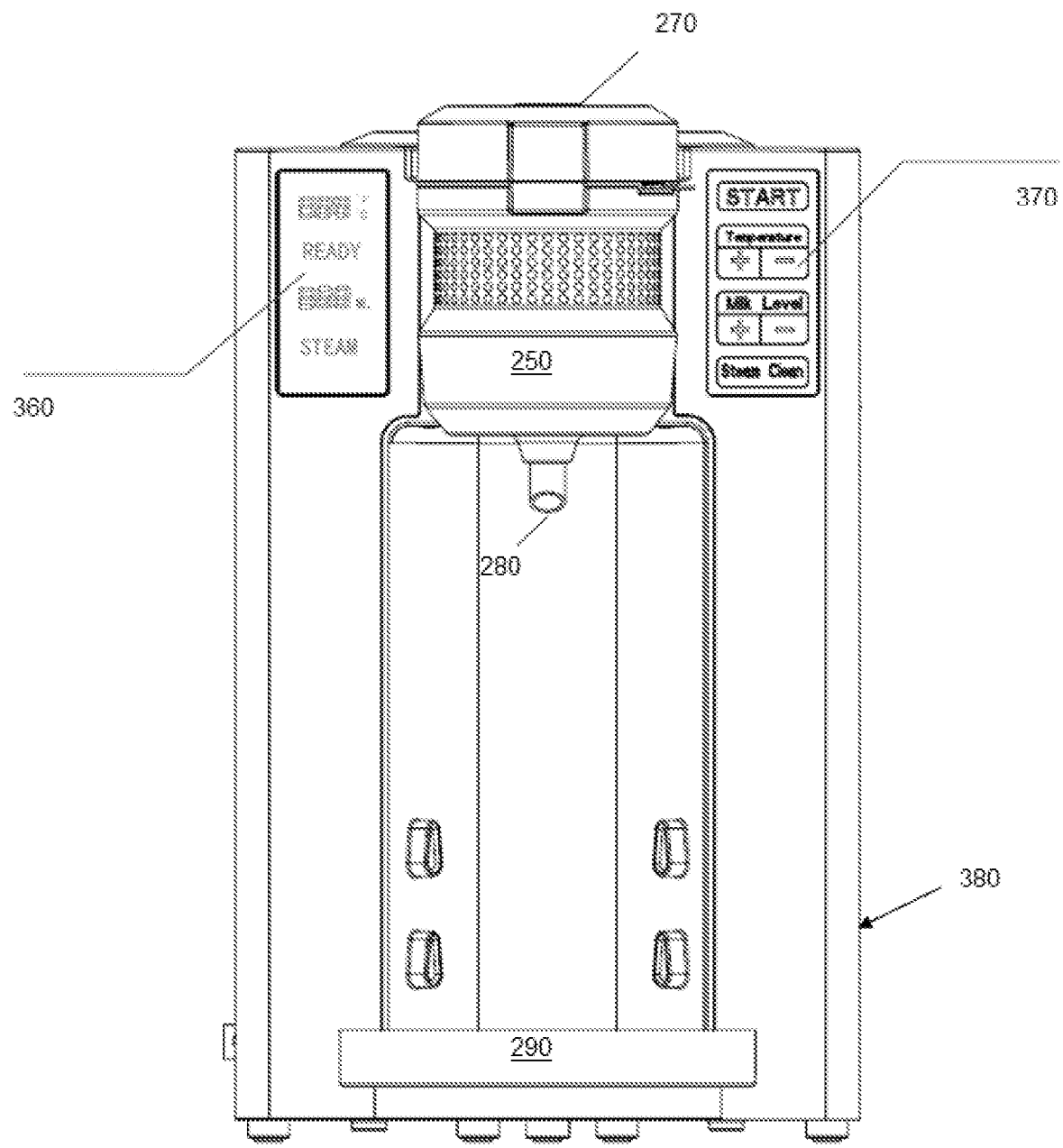
FIG. 5 is a front view of the machine.
Figure 6:
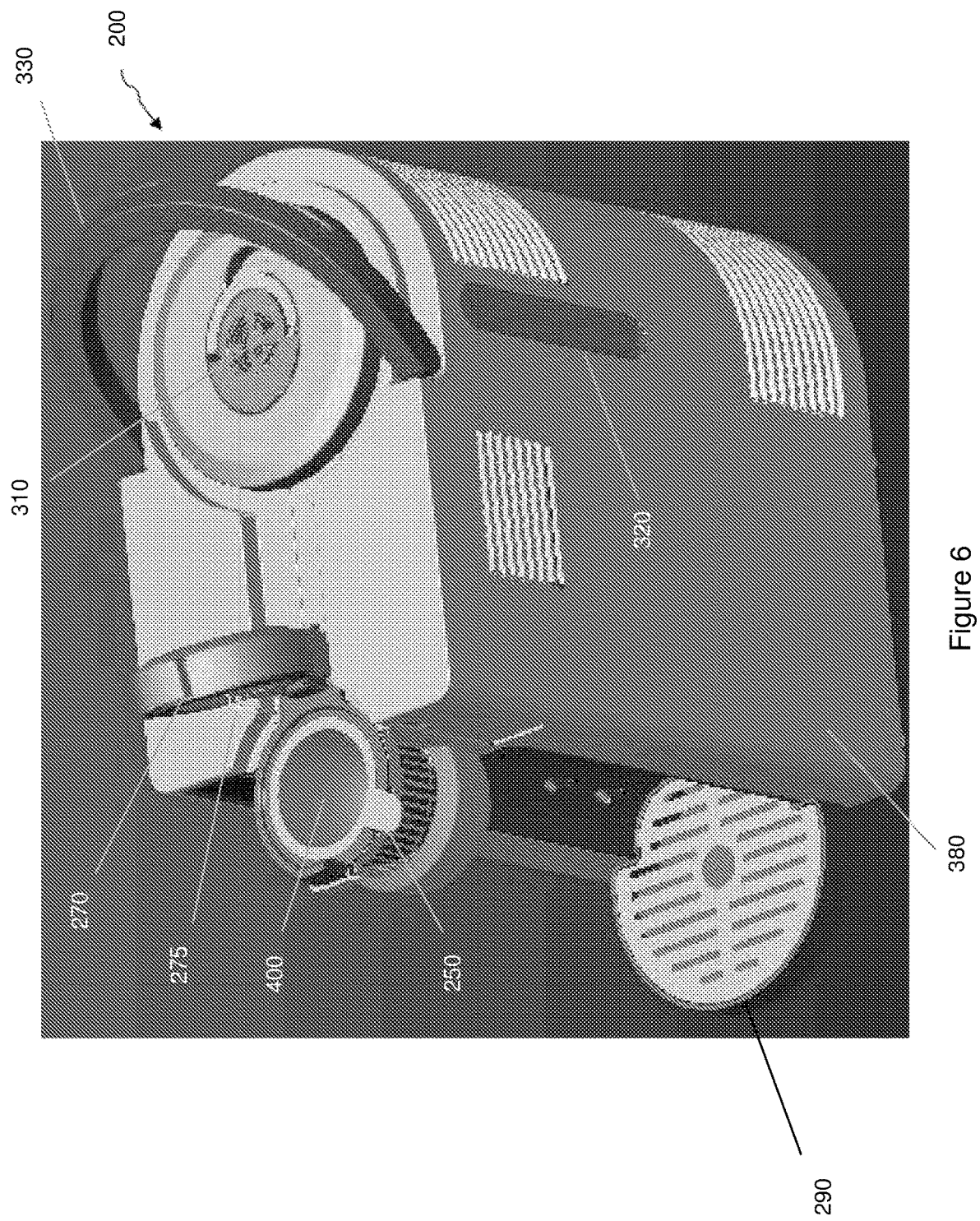
FIG. 6 is a top perspective view of the machine with a capsule in an open capsule chamber.
Figure 7:
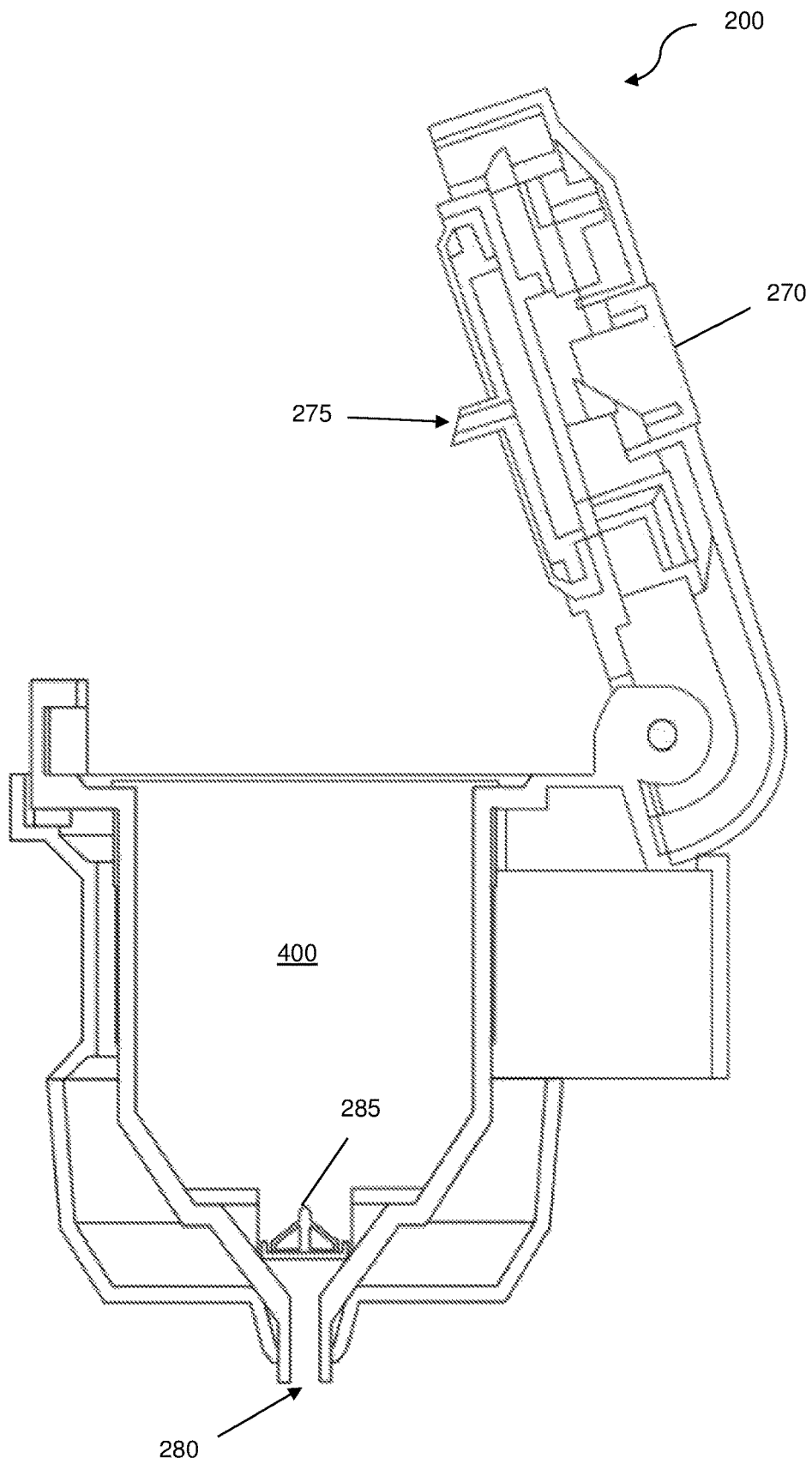
FIG. 7 is a partial side sectional view of the capsule chamber with the capsule-piercing lid open.

FIG. 1 is a flowchart of a machine-implemented method 100 of preparing infant milk formula according to an embodiment of the present invention. The method 100 starts at step 110 by heat-sterilising water. The water may be heated to a sterilisation temperature between around 70° C. and 100° C. The water may be stored in a water tank of a heated beverage machine, and maintained at the sterilisation temperature for a predetermined time, for example, between around 1 minute and 10 minutes. Other alternative or equivalent temperatures and times may also be used.

Next the method 100 moves to step 120 where the sterilised water is cooled to a predetermined or user-selected drinking temperature between around 35° C. and 45° C., for example, between around 37° C. and 40° C. The cooled, sterilised water may be stored in the water tank and maintained at the drinking temperature until the water tank is empty. Other alternative or equivalent temperatures and times may also be used.

At step 130, a capsule containing powdered infant milk formula is removably received in a capsule chamber of a heated beverage machine. The cooled, sterilised water is then injected at step 140 into the capsule chamber and through the capsule to form liquid infant milk formula. The method 100 ends at step 150 by steam-sterilising (or steam-cleaning) the capsule chamber after removal of the capsule from the capsule chamber. The steam used in step 150 may be generated by boiling the sterilised water stored in the water tank. The method 100 may further comprise generating an aural and/or visual alert to a user to initiate steam-sterilising step 150 after removal of the capsule from the capsule chamber.

FIGS. 2 to 7 illustrate an embodiment of heated beverage machine 200 suitable for implementing the method 100. The machine 200 may comprise a water heater 210 and a water cooler 220 respectively configured to heat and cool water stored in a water tank 230. A pump 240, such as an air pump, may be connected between the water tank 230 and a capsule chamber 250. A flowmeter 260 may be connected between the pump 240 and the capsule chamber 250.

The capsule chamber 250 may be generally similar to those conventionally used on capsule coffee machines. The capsule chamber 250 may have a hollow generally cylindrical body to removable receive a capsule 400 containing powdered infant milk formula. The capsule chamber 250 may further comprise a hinged lid 270 with an internally arranged upper capsule piercer 275 that, in use, protrudes centrally downwardly to pierce an upper portion of the capsule 400, and a dispensing outlet 280. A lower capsule piercer 285 that, in use, pierces a lower portion of the capsule 400 may be provided to protrude centrally upwardly into the capsule chamber 250 above the dispensing outlet 280. A drip tray 290 may be provided under the dispensing outlet 280. A steam generator (or steam boiler) 300 may also be connected to the water tank 230 and the capsule chamber 250.

The water tank 230 may comprise a stainless steel tank having an exhaust valve 310, a water level gauge 320, and an external handle 330. The water heater 210 may comprise a jacket hot-water boiler. The water cooler 220 may comprise a finned air-cooled heat sink configured to cool the water tank 230. The finned air-cooled heat sink 220 may comprise a finned heat sink 220A mounted around the water tank, and a ducted cooling fan 220B configured to direct cooling air from air inlet vents in an external housing 340 over and around the finned heat sink 220A. Other alternative or equivalent water heating and cooling arrangements may also be used.

The machine 200 may further comprise a controller (not shown) connected to the water heater 210, the water cooler 220 and the pump 240. The controller may be configured to implement the method 100 described above. The machine 200 may further comprise a user interface 350 connected to the controller, and configured to receive user selections of one or more of water temperature, heat-sterilisation time and steam-sterilisation time. The user interface 350 may comprise a LED display 360 to display functional parameters and operating status or modes of the machine 200, and a button panel 370 or touch-screen display to receive user selections of functional parameters and operating status or mode. The machine 200 may further comprise an aural and/or visual alert generator configured to generate an alert to remind a user initiate steam-sterilising of the capsule chamber 250 after removal of the capsule.

The machine 200 may further comprise a housing 380 configured to house functional components of the machine 200. Optionally, a steam outlet tube (or wand) (not shown) may be connected to the steam generator 300 and provided externally of the housing 380. The steam outlet tube may be used to sterilise a baby bottle or froth the liquid infant milk formula. Other alternative or equivalent heated beverage machines may also be used to implement the method 100.

Figure 13:
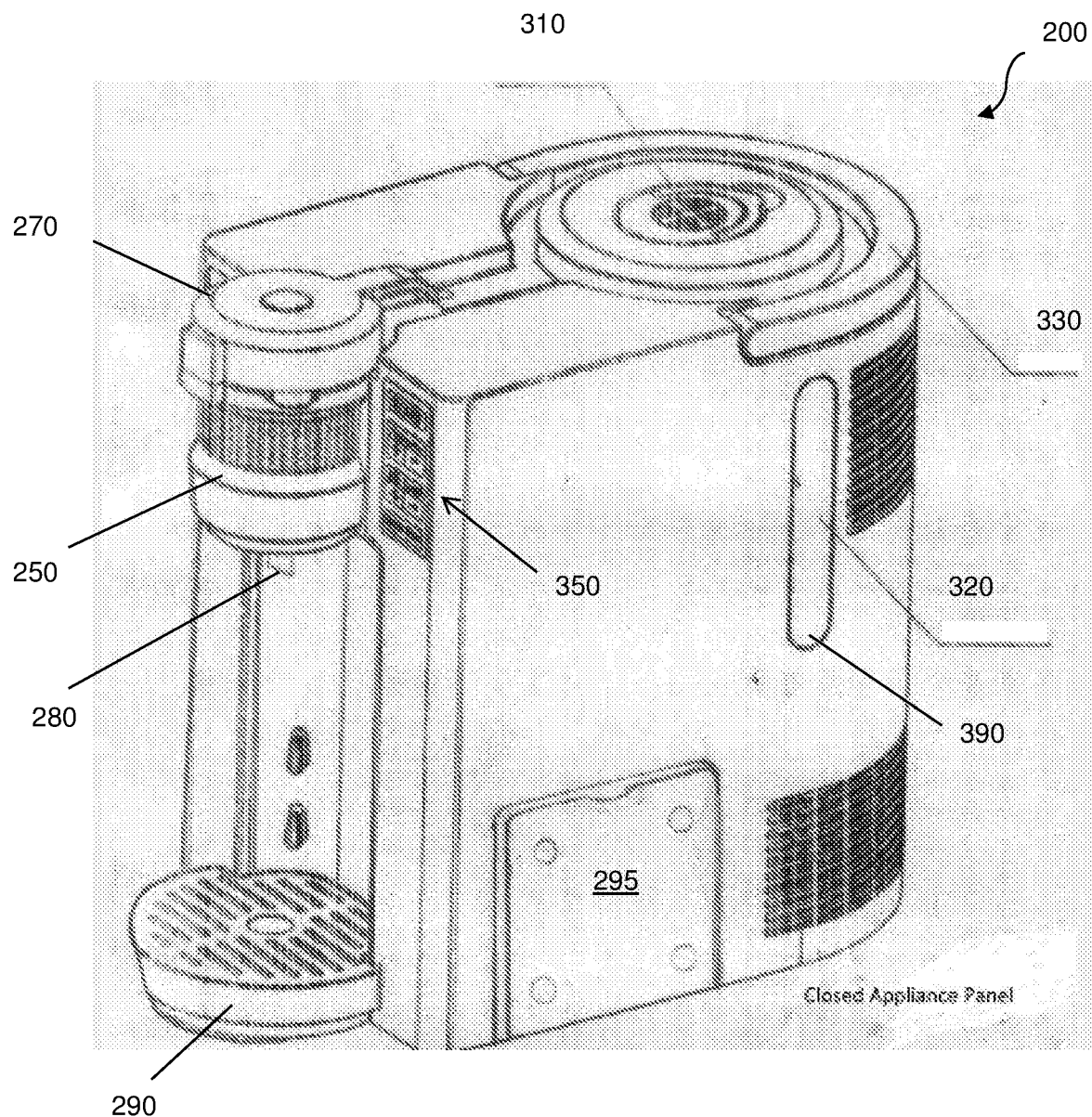
FIGS. 13 and 14 are perspective views of the machine showing an appliance tray in its closed and open positions, respectively.
Figure 14:
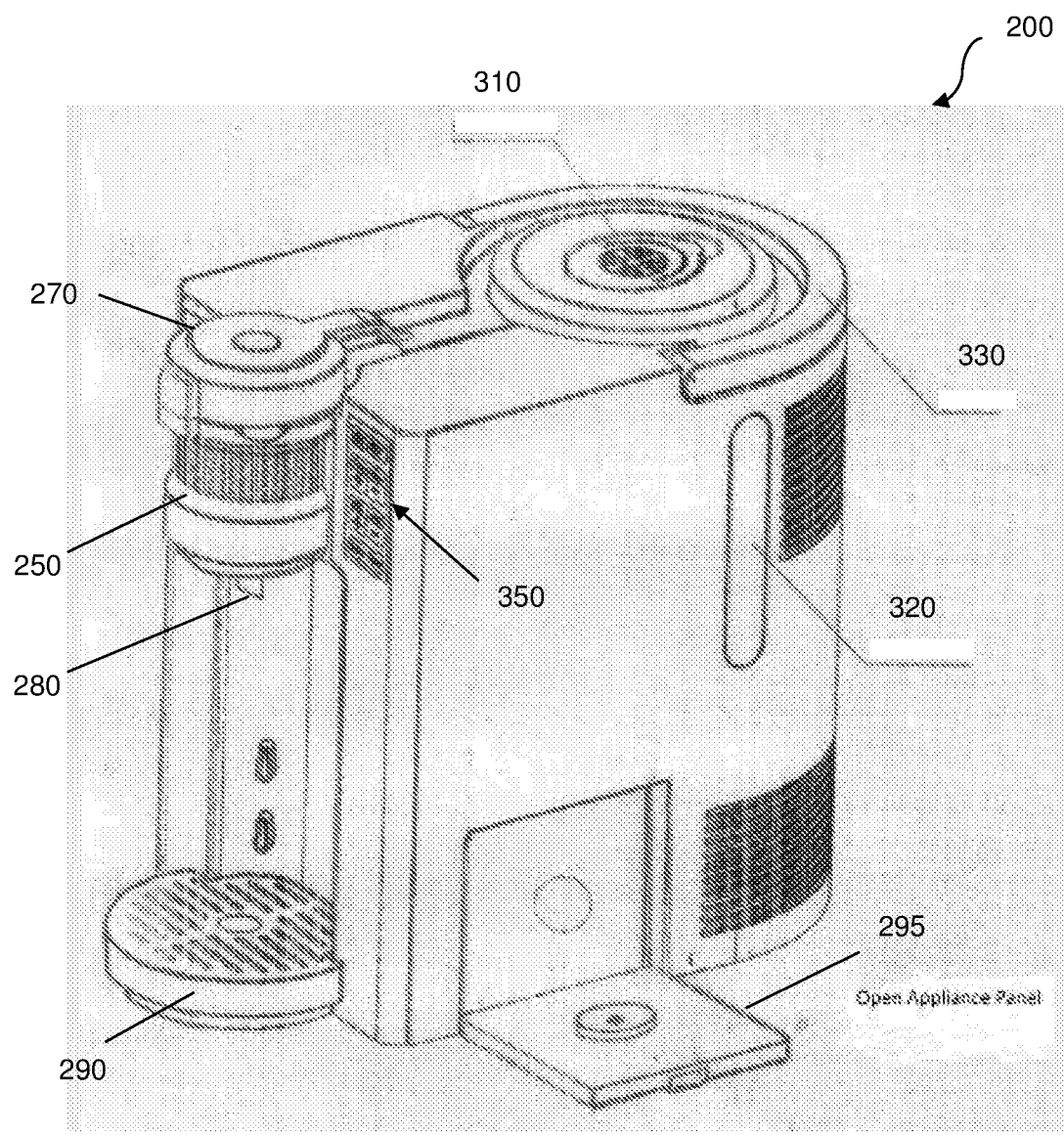

Referring to FIGS. 13 and 14, the machine 200 may further comprise an appliance tray 295 for supporting and electrically connecting a kitchen appliance (not shown) closely adjacent to the machine 200. The appliance tray 295 may be downwardly and outwardly foldable or pivotable from the housing 380 of the machine 200. The appliance tray 295 may comprise an electrical connector, for example a coaxial electrical connector, that is electrically connectable to a complementary electrical connector in the base of the kitchen appliance. The kitchen appliance may comprise a countertop kitchen appliance comprising a food processor, a steam generator, a grinder, a blender, a mixer, and combinations thereof. The kitchen appliance may be used in conjunction with the milk formula machine 200 to conveniently perform further or additional beverage or food preparation tasks. Although the fold-out appliance tray 295 has been described in the present context of the milk formula machine 200, it will be appreciated that it may be further or alternatively implemented in other types of kitchen appliances and beverage-making machines. For example, the fold-out appliance tray 295 may be alternatively implemented in the coffee machine described in the present applicant's WO 2014/128542, the contents of which are hereby incorporated in their entirety by reference.

Figure 8:
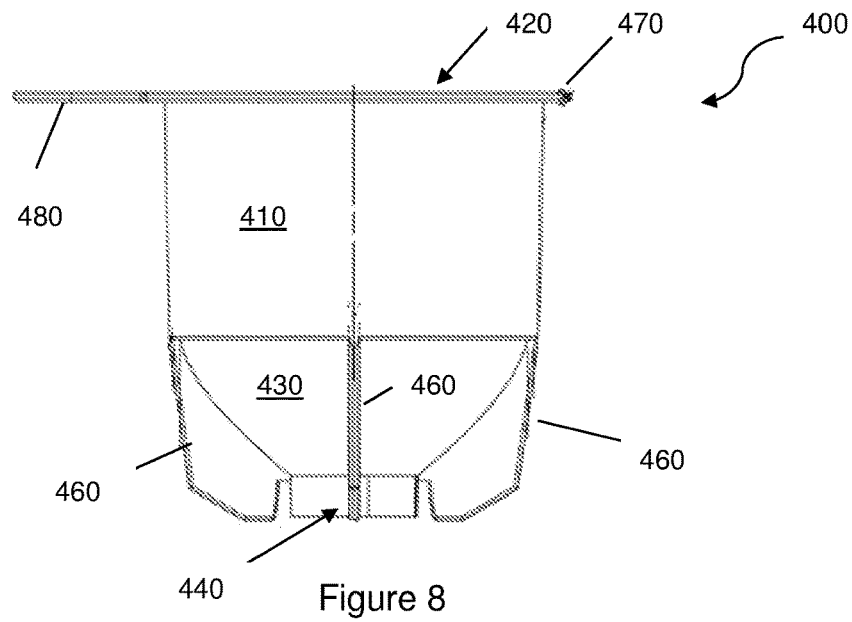
FIGS. 8, 9 and 10 are side, top and inverted sectional views of a capsule for containing powdered infant milk formula that is suitable for use in the method or machine.
Figure 9:
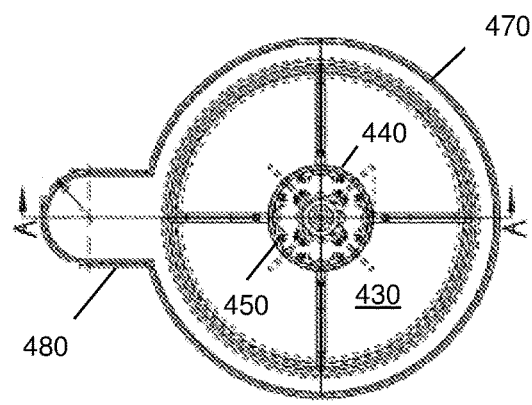
Figure 10:
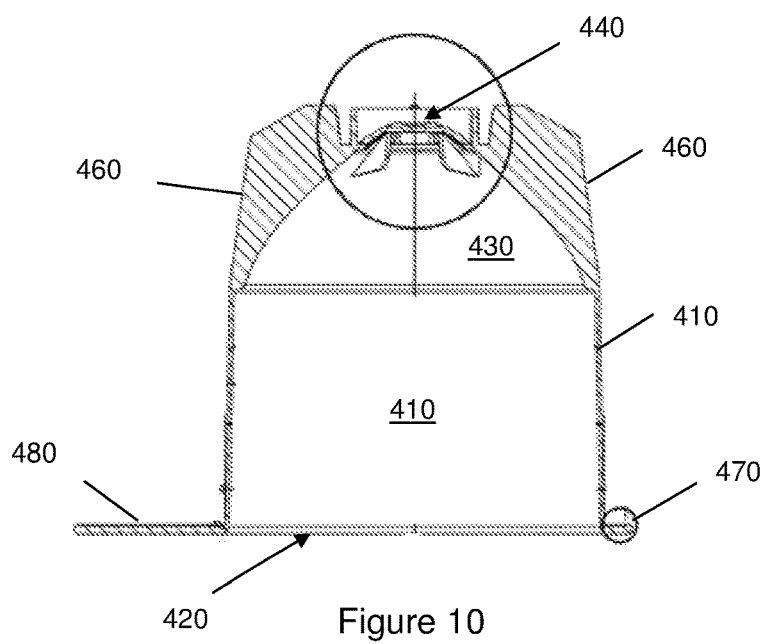
Figure 11:
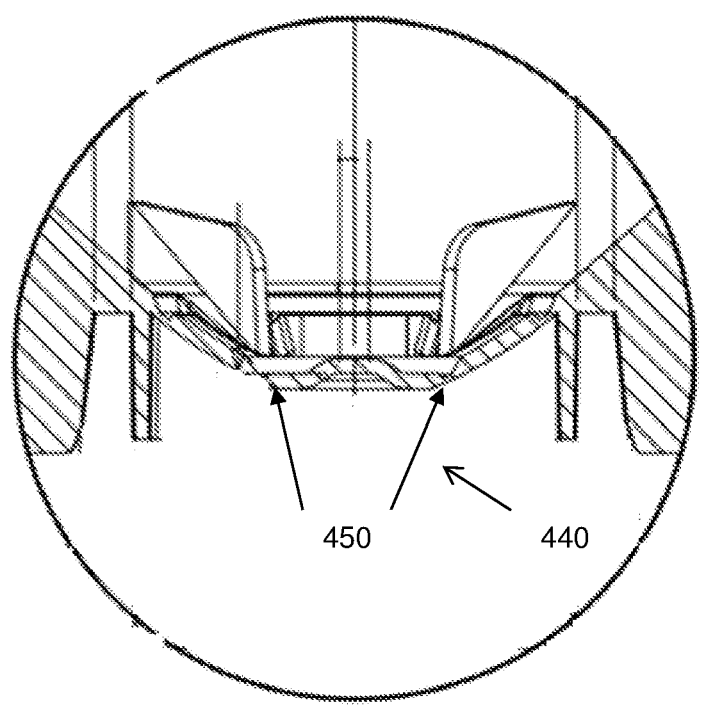
FIG. 11 is enlarged detail view of FIG. 10.
Figure 12:
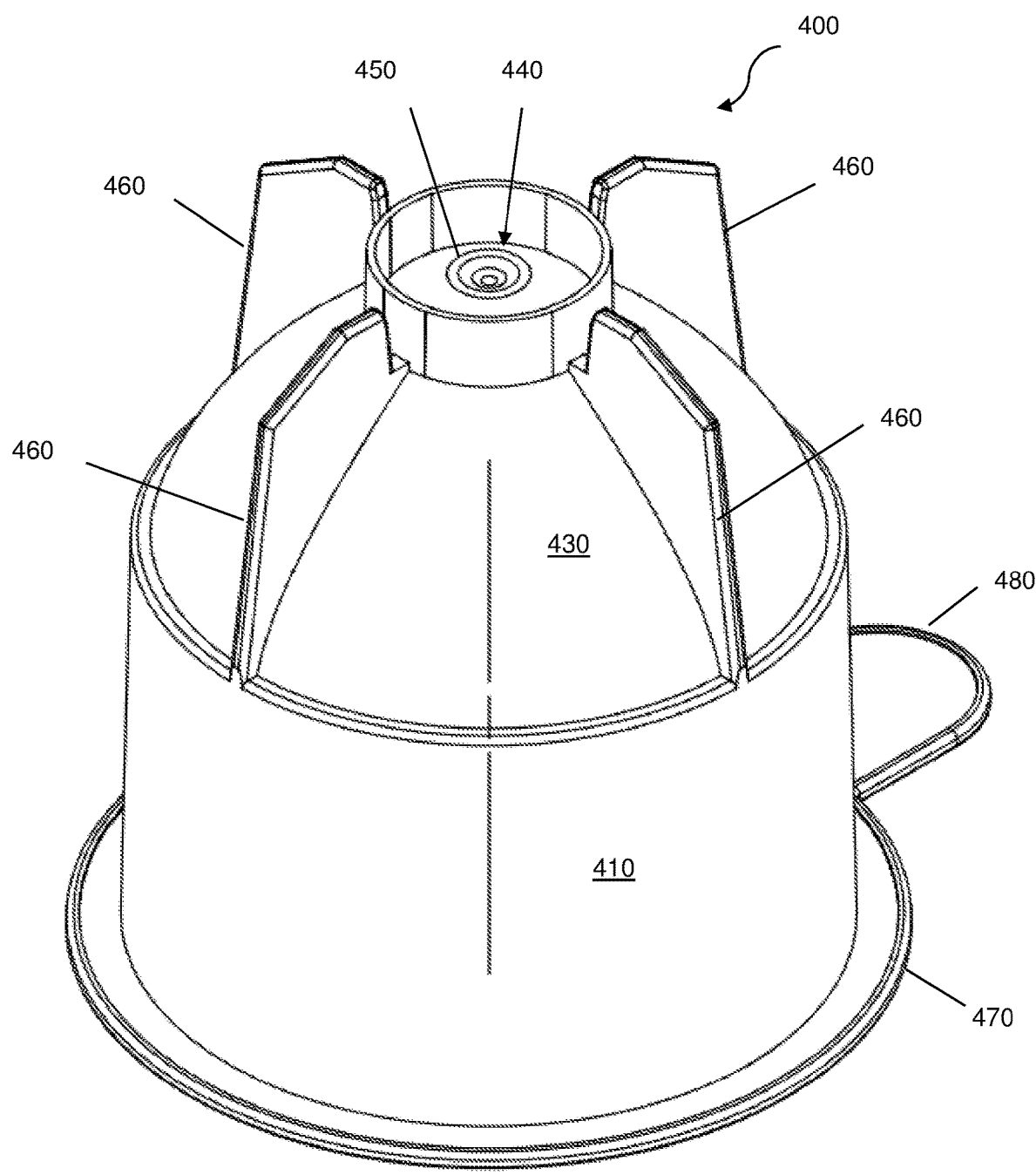
FIG. 12 is an inverted perspective view of the capsule.

FIGS. 8 and 9 illustrate an embodiment of a capsule 400 for containing powdered infant milk formula that is suitable for use in the method 100 or machine 200. The capsule 400 may comprise a hollow generally cylindrical body portion 410 having a top opening 420 sealingly closed by an upper pierceable membrane (not shown). The capsule 400 may further comprise a hollow generally hemispherical base portion 430 having a central bottom pierceable closure 440. A plurality of positioning flanges 460 may extend downwardly from the base portion 430 around the central bottom pierceable closure 440. Referring to FIG. 11, the bottom pierceable closure 440 may comprise one or more weakened frangible portions, for example a circular weakening groove 450 with an indented central portion, integrally formed in the base portion 430.

A circumferential lip 470 may extend radially outwards around the top opening 420 of the body portion 410. A finger tab 480 may extend outwardly from the lip 470. The lip 470 and the finger tab 480 may assist positioning of the capsule 400 in the capsule chamber 250. The plurality of positioning flanges 460 may be complementarily shaped and configured to the capsule chamber 250 to allow the capsule 400 to be positively positioned and securely received in the capsule chamber 250.

The bottom pierceable closure 440 of the capsule 400 may be pierced by the lower capsule piercer 285 when the capsule 400 is inserted into the capsule chamber 250 of the machine 200 to provide a flow path through the capsule 400 after piercing and water injection. The particle size and viscosity of the powdered infant milk powder may be selected to enhance mixing with the cooled, sterilised water that is injected through the capsule 400 to form liquid infant milk formula. The components of the capsule 400 may be integral mouldings of plastic, except for the upper pierceable membrane which may be made of plastic film, metal film or a combination thereof. Other alternative or equivalent capsules may also be used in the method 100 or machine 200.

Embodiments of the present invention provides a machine-implemented method and related machine that are useful for safe, hygienic and convenient preparation of infant milk formula. Other embodiments of the invention provide a capsule for containing powdered infant milk formula that is suitable for use in the method or machine of the invention.

Embodiments of the machine of present invention may inject user-selected temperature water and inject into a capsule containing formulated powder (milk, soya bean or other powdered infant formulas). The machine may be configured to provide the functions of heating the water to a desired temperature for sterilisation, and then cool the water to the desired drinking temperature. The machine may have a stainless steel water tank with heating element. In some embodiments, the machine may have a cooling fan system underneath the water tank. In other embodiments this may be reversed. The water tank may have a heat sink around it to absorb the heat from the steel water tank heated by the water temperature. Around the heat sink may be a shroud that acts as a wind tunnel containing the cold air passage from the source of the air to the outlet.

The cooling fan may switch on at a desired temperature (eg, around 37° C. and 40° C.) setting once the sterilisation point has been reached, and may then commence operations switching on and blowing cold air over the heat sink lowering the temperature of the water tank to a desired temperature suitable for injecting the capsule and drinking. The cooling fan may draws air from a series of air inlet vents located at the bottom of the water tank housing to allow the fan to draw air. The fan may blow the air in an upward direction along the heat sink that is connected to the water tank. Alternatively, the fan may be also mounted on top of the water tank and air blown in a downward direction (ie, opposite installation). Air passing over the heat sink may be configured or directed in many directions. As the air passes over the heat sink, it may assist in lowering the water temperature to the desired drinking temperature. The air may then exit the chamber at the top of the housing (or in many other configured positions on the housing) through a series of vents. The machine may be configured to keep the desired drinking temperature for drinking constantly for the duration of the water in the tank at the drinking temperature.

In certain embodiments, the machine may have a sensor in the lid of the water tank to monitor attempts to add water that has not been sterilised, adding more water to the tank will trigger a reset and boil again to the selected sterilising temperature. The machine may be configured to inject a set amount of water through the capsule mixing with the powder creating the liquid formula flowing through the bottom out let of the capsule and into the container used for consumption of the liquid infant milk formula. After injection, the machine may only be operated again by removal of the spent capsule, and subsequent activation of the steam clean function. The steam clean may clean the capsule chamber and liquid outlet track removing any residue leftover be the injection process. After steam cleaning of the machine, the next injection may take place.

In some embodiments, the machine may have a secondary steam function operated independently for the sterilisation of the receiving container of the end product (ie, milk, etc). The steam arm located on the side of the machine may be enabled independently sterilising the end use container and other implements (eg, bottle, etc).

The control panel of the machine may be configured to enable the user to set the device to the desired configuration. The water temperature for injection may be selected, as well as the amount of water to be injected. Once this has been done, the start button may be depressed to commence operation. Depressing the start button depressed may start heating and boiling of the water in the water tank. Upon reaching its sterilisation point (eg, 100° C.) the device may continually heat the water for a period of 10 minutes automatically. After this period is completed, the LED control panel may show the temperature of the water, and automatically the cooling system may commence to lower the temperature to the desired drinking setting. The control panel may then indicate the temperature is now suitable for drinking and the injection process can commence (eg, at around 35° C. to 40° C.). At this point the water has been sterilised and cleaned of any microorganisms that may cause problems to humans.

The water may then be lowered to the comfortable temperate for drinking. The injection process may be initiated by depressing the inject button. The correct temperature for drinking water may now be injected through the machine to the capsule chamber. The capsule chamber may contain the desired capsule for injecting. The water may then be injected via a pump to the chamber piecing the capsule lid, and injecting water through it mixing with the powder and dispensing it through the stainless steel outlet of the capsule chamber and into a receptacle or container ready for human consumption.

Removing the spent capsule may activate an aural alert reminder to activate the steam cleaning function. By this action, the steam may commence to flow through the capsule chamber, thereby sterilising and preparing it for the next injection. The above operating sequence may be repeated with the sterilised water that is kept in constant drinking temperature with the thermostat control "keep warm function" until the water in the tank has been consumed. After refilling the empty tank, and securing the lid the water, may then again be sterilised to the boiling point for the 10 minute period followed by the cooling function and readied for drinking temperature injection. The water tank may have a visual display gauge on the side of the tank to visually check water content.

Periodically the machine may be cleaned with the steam function without injecting water through the capsule using the internal steam generator, by depressing the steam button this can be manually done separately from the injection cycle. The injection system may have a secondary pump to ensure no vacuum build up in the capsule chamber disallowing the complete mixture of water and powder, by blowing air into the chamber forcing the completion of the mixture process. The injection process may then be considered to have been completed. Other alternative or equivalent operating sequences and functional modes may also be used.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A machine for producing liquid infant milk formula, comprising:
   a water heater and a water cooler respectively configured to heat and cool water stored in a water tank, wherein the water tank is configured to initially store water heated by the water heater at a sterilization temperature for a predetermined time and thereafter store cooled, sterilised water cooled by the water cooler until it is used;
   a pump connected to the water tank;
   a capsule chamber fluidly connected to the water tank, and configured to removably receive a capsule containing powdered infant milk formula;
   a housing configured to house functional components of the machine;
   an appliance tray for supporting and electrically connecting a kitchen appliance, wherein the tray is outwardly foldable from the housing; and
   a controller connected to the water heater, the water cooler and the pump, wherein the controller is configured to implement a method in which the machine performs the following steps:
   heat-sterilising water by the water heater heating the water to a sterilisation temperature and storing the heated water in the water tank to maintain the water at the sterilization temperature for a predetermined time;
   cooling the sterilised water by the water cooler to a drinking temperature and storing the cooled, sterilised water in the water tank;
   removably receiving a capsule containing powdered infant milk formula in the capsule chamber;
   injecting the cooled, sterilised water into the capsule chamber and through the capsule to produce the liquid infant milk formula; and
   steam-sterilising the capsule chamber after removal of the capsule.

2. The machine of claim 1, wherein the water cooler comprises a finned air-cooled heat sink configured to cool the water tank.

3. The machine of claim 2, wherein the finned air-cooled heat sink comprises a finned heat sink mounted around the water tank, and a ducted cooling fan configured to direct cooling air over and around the finned heat sink.

4. The machine of claim 1, further comprising a user interface connected to the controller and configured to receive user selections of one or more of water temperature, heat-sterilisation time and steam-sterilisation time.

5. The machine of claim 1, further comprising an alert generator configured to generate an alert to steam-sterilise the capsule chamber after removal of the capsule.

6. The machine of claim 1, wherein the housing comprises a drip tray arranged under the capsule chamber.

7. The machine of claim 1, further comprising a steam generator connected to the water tank and the capsule chamber.

8. A capsule for containing powdered infant milk formula for use in the machine of claim 1, wherein the capsule comprises:
   a hollow generally cylindrical body portion having a top opening sealingly closed by a pierceable membrane;
   a hollow generally hemispherical base portion having a central bottom pierceable closure; and
   a plurality of positioning flanges extending downwardly from the base portion around the central bottom opening.

9. The capsule of claim 8, wherein the bottom pierceable closure comprises one or more weakened frangible portions integrally formed with the base portion.

10. The capsule of claim 8, wherein the plurality of positioning flanges are complementarily shaped and configured to the capsule chamber of the machine.

11. A system for preparing infant milk formula, the system comprising:
   a machine, comprising:
      a water heater and a water cooler respectively configured to heat and cool water stored in a water tank, wherein the water tank is configured to initially store water heated by the water heater at a sterilization temperature for a predetermined time and thereafter store cooled, sterilised water cooled by the water cooler until it is used;
      a pump connected to the water tank;
      a capsule chamber fluidly connected to the water tank, and configured to removeably receive a capsule containing powdered infant milk formula; and
      a controller connected to the water heater, the water cooler and the pump;
   a capsule for containing powdered infant milk formula, comprising:
      a hollow generally cylindrical body portion having a top opening, the top portion sealingly closed by an upper pierceable membrane;
      a hollow generally hemispherical base portion having a central bottom pierceable closure; and
      a plurality of positioning flanges extending downwardly from the base portion around the central bottom opening, wherein the plurality of positioning flanges are complementarily shaped and configured to the capsule chamber of the machine.

12. A machine-implemented method, comprising:
   heat-sterilising water by heating the water to a sterilisation temperature and storing the heated water in a water tank that maintains the water at the sterilization temperature for a predetermined time;
   cooling the sterilised water to a drinking temperature and storing the cooled, sterilised water in the water tank;
   removably receiving a capsule containing powdered infant milk formula in a capsule chamber, wherein the capsule comprises:
      a hollow generally cylindrical body portion having a top opening sealingly closed by a pierceable membrane;
      a hollow generally hemispherical base portion having a central bottom pierceable closure; and
      a plurality of positioning flanges extending downwardly from the base portion around the central bottom opening;

injecting the cooled, sterilised water into the capsule chamber and through the capsule to form liquid infant milk formula; and steam-sterilising the capsule chamber after removal of the capsule.

13. The method of claim 12, wherein the sterilisation temperature is between around 70° C. and 100° C.

14. The method of claim 12, wherein the predetermined time is between around 1 minute and 10 minutes.

15. The method of claim 12, wherein the drinking temperature is between around 35° C. and 45° C.

16. The method of claim 15, wherein the drinking temperature is between around 37° C. and 40° C.

17. The method of claim 12, wherein the cooled, sterilised water is stored in the water tank and maintained at the drinking temperature until the water tank is empty.

18. The method of claim 12, further comprising generating an alert to steam-sterilise the capsule chamber after removal of the capsule.

* * * * *